Figure 1:
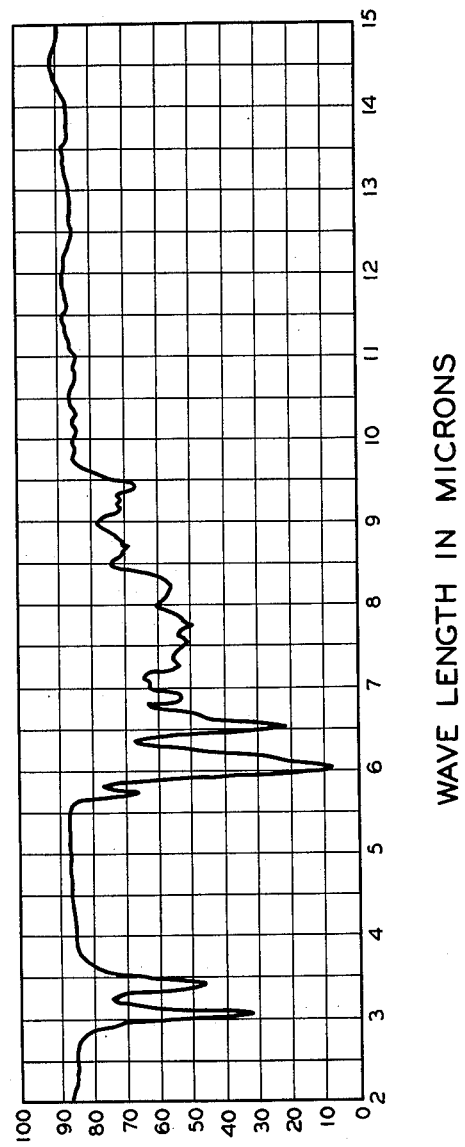
Figure 2:
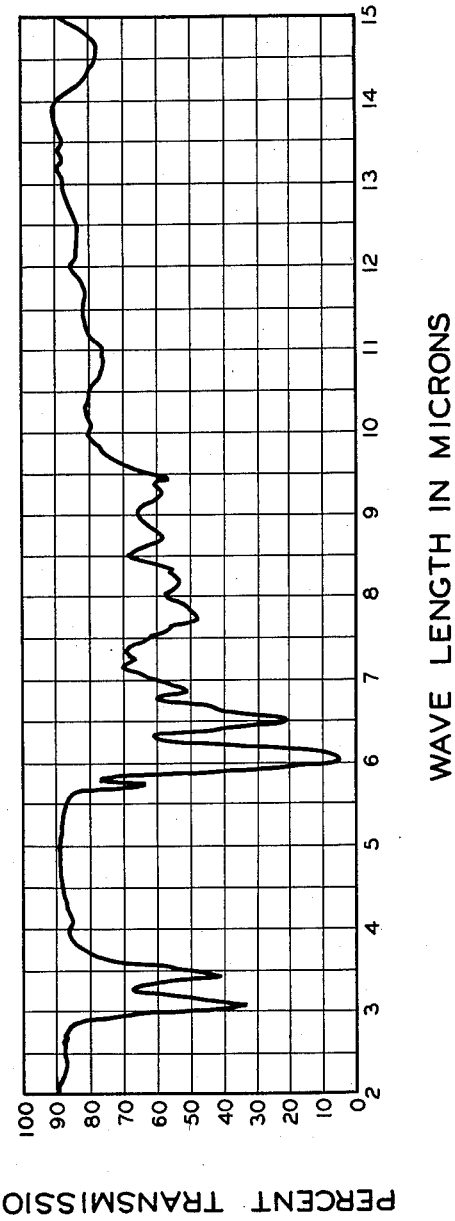

United States Patent Office 3,061,514
Patented Oct. 30, 1962

3,061,514
ANTIBIOTICS A116SO AND A116SA AND THEIR
FERMENTATIVE PRODUCTION
Albert Saeger, Grandview, Mo., assignor, by direct and mesne assignments, to Eli Lilly and Company, Indianapolis, Ind., a corporation of Indiana
Filed Aug. 26, 1959, Ser. No. 836,149
7 Claims. (Cl. 167—65)

This invention relates to novel organic compounds. More particularly, it relates to novel organic compounds of a peptide character and to processes for their preparation.

The novel peptides of this invention are arbitrarily named and are referred to herein as A116SA and A116SO. The novel peptides are closely related chemically and have similar antimicrobial spectra and properties. The peptides can be provided by the same processes and are commonly produced simultaneously. It appears that their respective molecular structures contain an equivalent number of molecular units of the same amino acids.

The chemical, physical, and other properties of the novel peptides as hereinafter set forth, identify and differentiate them from previously known or described compounds.

A116SO has the following characteristics: It is a white solid which is soluble in a number of solvents. It is soluble in most polar organic solvents, for example, in lower alcohols such as methanol, ethanol, isopropanol, n-butanol, and pentanol, in lower esters such as ethyl acetate and amyl acetate, and in lower ketones such as acetone, methyl ethyl ketone, and methyl isobutyl ketone, but is insoluble in diisobutyl ketone. It is soluble in dimethyl formamide and acetonitrile. A116SO is soluble in chloroform but is relatively insoluble in carbon tetrachloride, benzene, and diethyl ether, and in aliphatic hydrocarbons such as, for example, hexane and heptane. It is relatively insoluble in water.

The A116SO compound is relatively stable in solution over a pH range of about pH 2 to about pH 8, but is relatively unstable in the basic pH range above pH 8 and in highly acidic solutions.

By the standard electrometric titration employing a dimethyl formamide-water solution (2:1, parts by volume) as solvent, A116SO does not reveal any titratable group having a pK'a in the range of pK'a 3.5 to pK'a 14.

The molecular weight of A116SO is about 1840 as determined by electrometric titration of A116SO in glacial acetic acid employing perchloric acid as titrant.

An average of several elemental analyses of A116SO preparations which were dried in vacuo over anhydrous calcium sulfate for about 60 hours gave the following analytical values:

| | Percent |
|---|---|
| Carbon | 55.40 |
| Hydrogen | 8.33 |
| Nitrogen | 13.80 |
| Oxygen (by difference) | 22.47 |

The above data indicate an empirical formula for A116SO of $C_{85}H_{152}N_{18}O_{26}$, but as will be realized, this formula is necessarily only an approximation, and may be subject to some revision when the complete molecular structure of the compound becomes known.

The ultraviolet absorption spectrum of A116SO shows no significant maxima over the range of 205 m$\mu$ to 400 m$\mu$, when run in water at a concentration of 0.03 mg./ml. The only absorption is "end" absorption in the lower portion of the above range which decreases sharply from 205m$\mu$. A116SO shows the absorption values at 220 m$\mu$ of $$E_{1\,cm.}^{1\%} = 130$$

and at 205 m$\mu$ of $$E_{1\,cm.}^{1\%} = 330$$

The infrared absorption curve of A116SO in chloroform is shown as FIG. I of the accompanying drawings. The distinguishable maxima in the infrared region of 2.0$\mu$ to 15.0$\mu$ are as follows: 3.06, 3.41, 3.45, 3.50, 5.73, 6.05, 6.53, 6.65, 6.85, 7.06, 7.22, 7.55, 7.72, 7.85, 8.25, 8.69, 9.17, 9.26, 9.41, and 11.0 microns.

An average of several specific optical rotation values of preparations of A116SO dried as described above is $[\alpha]_D^{25°} = -83.4$, c.=1% in ethanol (weight per volume).

Analyses of acid hydrolysates of A116SO obtained by hydrolyzing samples with 5.7 N hydrochloric acid at 107° C. for 70 hours and 90 hours, respectively, show the presence of a number of molecular residues of amino acids. The analyses were carried out in the manner described by S. Moore and W. H. Stein in J. Biol. Chem. 192, 663 (1951). Assuming A116SO to have a molecular weight of about 1840 determined as set out above, the corrected data of the analyses show that at least one of each of threonyl, seryl, prolyl, glycyl, alanyl, valyl, and isoleucyl amino acid groups is present in each molecule of A116SO.

Chemical tests made on A116SO gave the following results: The biuret test for protein was positive. The Molisch and Benedict tests for presence of carbohydrate were negative. A116SO failed to decolorize permanganate solution. The compound gave a negative ninhydrin test for presence of $\alpha$-amino groups and a negative ferric chloride test for presence of phenolic groups. The compound gave a negative Van Slyke test for free amino groups. Additionally, it gave a negative xanthoproteic test for the presence of aromatic amino acids and a negative Million test for the presence of phenolic amino acids. A sulfur analysis showed no sulfur to be present. A Maltol test was negative.

Chromatography of A116SO on Whatman No. 1 paper gave the following $R_f$ values: $R_f$=0.87 in a solvent of n-butanol saturated with water; $R_f$=0.90 in a solvent of n-butanol saturated with water and containing 2 percent by weight of p-toluenesulfonic acid; $R_f$=0.0 in a solvent consisting of 1 part of n-propanol and 9 parts of water, by volume; and $R_f$=0.0 in a solvent of benzene saturated with water. In determining the foregoing values, A116SO was applied to the paper strips as an acetone solution.

In regard to A116SA, it is a peptide characterized by the following specific physical and chemical properties: It is a white solid which is stable in solution over a pH range of pH 2 to about pH 8, but is relatively unstable in the basic pH range above pH 8 and in highly acidic solutions. It is soluble in most polar organic solvents but is generally less soluble in polar organic solvents than is A116SO. It is soluble in lower alcohols such as methanol, ethanol, n-butanol, n-propanol, and pentanol, in lower ketones such as acetone and methyl ethyl ketone, but is relatively insoluble in methyl isobutyl ketone and diisobutyl ketone. It is soluble in dimethyl formamide but is relatively insoluble in acetonitrile. A116SA is soluble in chloroform but is relatively insoluble in carbon tetrachloride. A116SA is relatively insoluble in benzene, and diethyl ether, and in aliphatic hydrocarbons, for example, hexane and heptane. A116SA has a greater solubility in water than does A116SO.

An electrometric titration of A116SA in dimethyl formamide-water solution (2:1, parts by volume) does not reveal any titratable group having a pK'a over the range of pK'a 3.5 to pK'a 14.

The molecular weight of A116SA is about 2150 as determined by electrometric titration of A116SA in glacial acetic acid employing perchloric acid as titrant.

The average of several elemental analyses of A116SA preparations which were dried in vacuo over anhydrous calcium sulfate for about 60 hours gave the following analytical values:

| | Percent |
|---|---|
| Carbon | 54.52 |
| Hydrogen | 8.26 |
| Nitrogen | 13.26 |
| Oxygen (by difference) | 23.96 |

The above data indicate an empirical formula for A116SA of $C_{98}H_{175}N_{20}O_{32}$, but as in the case of A116SO, this formula is necessarily only an approximation. It may be subject to revision when the complete molecular structure of the compound becomes known.

A116SA shows no significant absorption maxima over the ultraviolet range of 205 mμ to 400 mμ, when determined in water at a concentration of about 0.03 mg./ml. The only absorption is "end" absorption in the lower portion of the range which decreases sharply from 205 mμ. A116SO shows the absorption values of $E_{1cm.}^{1\%} = 330$ at 205 mμ and of $E_{1cm.}^{1\%} = 130$ at 220 mμ

The infrared absorption curve of A116SA in chloroform is shown in FIG. II of the accompanying drawings. The distinguishable maxima in the infrared region of 2.0μ to 15.0μ are as follows: 3.06, 3.41, 3.45, 3.50, 5.73, 6.05, 6.53, 6.65, 6.85, 7.06, 7.22, 7.45, 7.57, 7.73, 7.87, 8.31, 8.70, 9.18, 9.28, 9.42, and 11.0 microns.

An average of several specific optical rotation values of dried preparations of A116SA is $[\alpha]_D^{25°} = -92.4$, c.=1% in ethanol (weight per volume).

Analyses of acid hydrolysates of A116SA provided by hydrolyzing samples with 5.7 N hydrochloric acid at about 107° C. for 70 hours and 90 hours, respectively, show that A116SA has the same amino acid groups shown to be present in A116SO. The analyses were conducted in the manner as described for A116SO.

A116SA gave substantially the same chemical test and chromatography results as set forth for A116SO.

A116SO and A116SA are characterized by their inhibitory action against growth of microbial organisms. They have a high order of activity against a number of fungi, including plant pathogenic fungi and dermatophytic fungi, and against yeast organisms. However, they have in general only a relatively moderate activity against gram-positive bacteria, and a relatively slight or negligible activity against gram-negative bacteria.

The levels in mcg./ml. at which A116SO and A116SA inhibit the growth of illustrative microorganisms are numerically set forth in Table I. The inhibitory levels were determined by the agar-dilution test in which the test organism was streaked on or was implanted in a series of nutrient agar plates containing various concentrations of either A116SO or A116SA to determine the minimum concentrations of the compounds in mcg./ml. required to inhibit the growth of the organism for the specified period of time.

TABLE I
FUNGI

| Test organism | Incubation time (hours) | Inhibitory Conc. (mcg./ml.) | |
|---|---|---|---|
| | | A116SO | A116SA |
| Pullularia sp. | 72 | 3.13 | 3.13 |
| Penicillium expansum | 72 | 3.13 | 3.13 |
| Alternaria solani | 72 | 1.56 | .78 |
| Glomerella cingulata | 72 | 1.56 | 1.56 |
| Endoconidiophora fagacearum | 72 | 1.56 | 3.13 |
| Ceratostomella ulmi | 72 | 1.56 | 1.56 |
| Helminthosporium sativum | 72 | 1.56 | 1.56 |
| Glomerella cingulata | 72 | 1.56 | 1.56 |
| Sclerotinia fructicola | 72 | .78 | .78 |
| Aspergillus niger | 72 | 6.25 | 6.25 |
| Colletotrichum lagenarium | 72 | .78 | 1.56 |
| Colletotrichum phomoides | 72 | 1.56 | 1.56 |
| Pellicularia filamentosa | 72 | 1.56 | 1.56 |
| Verticillium albo-atrum | 72 | 3.13 | 3.13 |
| Trichophyton rubrum | 48 | .78 | .78 |
| Trichophyton interdigitale | 48 | .78 | .78 |

YEASTS

| | | | |
|---|---|---|---|
| Saccharomyces pastorianus | 48 | 3.13 | 3.13 |
| Candida albicans | 48 | 3.13 | 3.13 |

BACTERIA—GRAM-POSITIVE

| | | | |
|---|---|---|---|
| Staphylococcus aureus | 48 | 12.5 | 25 |
| Staphylococcus albus | 48 | 25 | 25 |
| Bacillus subtilis | 48 | 25 | 25 |
| Sarcina lutea | 48 | 12.5 | 12.5 |
| Mycobacterium tuberculosis (607) | 48 | 12.5 | 12.5 |

In the tissue culture test described by Larsh et al. in Antibiotics Annual 1956–1957, 912 (1957), a preparation consisting of about equal quantities by weight of A116SO and A116SA displayed inhibitory activities against the yeast phase of pathogenic fungi as set out in Table II. The inhibitory activities are expressed in micrograms of the tested compound per milliliter of the tissue culture medium used.

TABLE II

Mcg./ml. of agent to produce 50 percent inhibition

Test organism:
| | |
|---|---|
| Histoplasma capsulatum | 0.1 |
| Cryptococcus neoformans | 33.0 |
| Blastomyces dermatitidis | 0.37 |
| Sporotrichum schenkii | <0.1 |
| Candida albicans | 3.2 |

A116SO and A116SA can be produced by culturing a newly found and hitherto undescribed organism strain isolated from a soil sample obtained from Jackson County, Missouri. The organism was grown using submerged culture fermentation under aerobic conditions in a culture medium containing assimilable sources of carbon, nitrogen, and inorganic salts. The organism was isolated from the above soil sample by suspending portions of the soil sample in sterile distilled water, and by plating the suspension on a nutrient agar. The seeded nutrient agar plates were incubated at about 25–35° C. for several days. At the end of the incubation time, colonies of the A116SA- and A116SO-producing organism were transferred with a sterile platinum loop to inoculate agar slants. The inoculated agar slants were incubated to provide larger amounts of inoculum for production of the compounds.

The novel organism capable of producing A116SA and A116SO has been placed on permanent deposit with The Culture Collection of the Northern Utilization Research and Development Branch of the U.S. Department of Agriculture, Peoria, Illinois, and has been assigned the culture number NRRL 2736.

The newly discovered organism is in many respects similar to the previously described organism *Streptomyces endus* (NRRL 2339) listed on page 69 of the classification of Pridham et al., Applied Microbiology 6, 52 (1958). Although there is some inherent uncertainty in classification of such microorganisms, it is believed justifiable to classify the novel organism NRRL 2736 as a new strain of the species *S. endus* and to consider *S. endus* (NRRL 2339) obtained from the above-named depository to be the most closely related, previously known organism. In contrast to our novel strain, *S. endus* (NRRL 2339) does not significantly utilize D(+) raffinose or sorbital. The *S. endus* (NRRL 2339) organism, as well as four other most closely related organisms, viz. *S. narbonensis* (NRRLB-1680), *S. arabicus* (NRRLB-1733), *S. naganishii* (NRRLB-1816), and *S. antimycoticus* [the species named A158 and described in Mycologia 44, 159 (1952)], have been cultured in the preferred media herein described, but no detectable amounts of A116SA or A116SO have ever been observed.

This invention will be described in detail with particular reference to the newly found organism, NRRL 2736. However, it is to be understood that the production of A116SA or A116SO by the growing of other A116SA- or A116SO-producing organisms such as other A116SA- and A116SO-producing strains and mutants are within the scope of this invention. Such other organisms, strains, or mutants can be produced by routinely employed procedures including the selection of cultured organisms, and the subjection of an A116SA- or A116SO-producing organism to X-ray or ultraviolet irradiation, or to chemical agents, for example, the nitrogen mustards.

In the following paragraphs, the results of a detailed taxonomic study of the NRRL 2736 culture are set forth. The colors used in the description are in accordance with the definitions used in Ridgway: Culture Standards and Nomenclature (1912).

MICROSCOPIC MORPHOLOGY

Tomato paste-oatmeal agar (14 days at 30° C.): Spore chains are in compact spirals. Conidia are subglobose.

Inorganic salts-starch agar (14 days at 30° C.): Microscopic morphology like that observed on tomato paste-oatmeal agar.

CULTURAL CHARACTERISTICS

Czapek's agar (14 days at 30° C.): Moderate growth. Scant aerial mycelium. Reverse near buff.

Glucose-asparagine agar (14 days at 30° C.): Sparse growth. Aerial mycelium scant, light gray. Reverse light gray.

Inorganic salts-starch agar (14 days at 30° C.): Moderate growth. Aerial mycelium moderate, gray, with scattered areas near black. Reverse pale cream.

Tomato paste-oatmeal agar (14 days at 30° C.): Moderate growth. Aerial mycelium moderate, gray with scattered areas becoming black.

Emerson's agar (14 days at 30° C.): Fair growth. Aerial mycelium scant, pale gray. Reverse cream.

Potato plug agar (14 days at 30° C): Fair growth. Aerial mycelium fair, near white.

PHYSIOLOGY

Action on skim milk—coagulation; partial peptonization
$H_2S$ production—none
Nitrate reduction—none
Gelatin liquefaction—moderate In Table III are set forth the results of carbon utilization tests carried out on the organism NRRL 2736. In the table, the following symbols are employed:

+ = growth and utilization
— = no growth, no utilization

TABLE III

*Carbon Utilization Pattern for NRRL 2736*

| Compound: | Growth response |
|---|---|
| L(+) arabinose | + |
| L(+) rhamnose | + |
| D ribose | + |
| D(+) xylose | + |
| D(—) fructose | + |
| D(+) glucose | + |
| lactose | + |
| D(+) melibiose | + |
| sucrose | + |
| D(+) trehalose | + |
| D(+) raffinose | + |
| cellulose | — |
| Inulin | + |
| i-inositol | + |
| mannitol | + |
| d-sorbitol | + |
| salicin | — |

As noted, A116SA and A116SO can be produced by cultivation of NRRL 2736. The culture medium can be any one of a number of media since, as is apparent from the above-described utilization tests, the organism is capable of utilizing many energy sources. However, for economy of production, maximum yields of antibiotic, and ease of isolation of the compounds, certain culture media are preferable. The media which are useful in the production of A116SA and A116SO include an assimilable source of carbon such as glucose, sucrose, fructose, starch, glycerine, molasses, dextrin, brown sugar, corn steep solids, and the like. The preferred sources of carbon are glucose and starch. Additionally, employable media include a source of assimilable nitrogen such as linseed meal, tankage, fish meal, cotton seed meal, oatmeal, ground wheat, soybean meal, beef extract, peptones (meat or soy), casein, amino acid mixtures, and the like. Preferred sources of nitrogen are soybean meal, casein, and corn steep solids.

Mineral salts, for example, those providing sodium, potassium, ammonium, calcium, magnesium, cobalt, sulfate, chloride, phosphate, carbonate, acetate, and nitrate ions, and a source of growth factors such as distillers' solubles and yeast extract, can be incorporated into the media with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied widely. However, it has been found desirable that the initial pH of the medium be between about pH 5.5 and about pH 8.0, and preferably about pH 6.0 to about pH 7.0. As has been observed with other actinomycetes, the pH of the medium gradually increases throughout the growth period of the organism during which time A116SA and A116SO are produced, and may attain a pH from about pH 7 to about pH 8 or above, the final pH being dependent at least in part on the initial pH of the medium, the buffers present in the medium, and the period of time the organism is permitted to grow.

Submerged, aerobic cultural conditions are the conditions of choice for the production of the compounds. For preparation of relatively small amounts, shake flasks and surface culture in bottles can be employed, but for the preparation of large amounts, submerged aerobic culture in sterile tanks is preferred. The medium in the sterile tank can be inoculated with a sporulated suspension, but because of the growth lag experienced when a sporulated suspension is used as the inoculum, the vegetative form of the culture is preferred. By thus avoiding the growth lag, more efficient use of the fermentation equipment is realized. Accordingly, it is desirable first to produce a vegetative inoculum of the organisms by inoculating a relatively small quantity of culture medium with the spore form of the organism, and when a young, active vegetative inoculum has been obtained, to transfer the vegetable inoculum aseptically to the large tank. The medium in which the vegetative inoculum is produced can be the same or a different medium than that utilized for the large scale production of A116SA and A116SO.

The organisms grow best at temperatures in a range of about 25° C. to about 32° C. Optimal A116SA and A116SO production apepars to occur at a temperature of about 26–30° C.

As is customary in submerged culture processes, sterile air is blown through the culture medium. For efficient growth of the organism and A116SA and A116SO production, the volume of air employed in the tank production of A116SA and A116SO preferably is upwards of 0.1 volume of air per minute per volume of culture medium. Efficient growth and optimal yields of A116SA and A116SO are obtained when the volume of air used is at least one volume of air per minute per volume of culture medium.

The combined concentration of A116SA and A116SO activity in the culture medium can readily be followed during the fermentation period by testing samples of the culture medium for their inhibitory activity against the growth of an organism known to be inhibited in the presence of A116SA and A116SO. The use of the organism *Fusarium moniliforme* has been found to be very satisfactory for this purpose. The testing can be carried out by the known turbidimetric or cup-plate methods.

In general, maximum production occurs after inoculation of the culture medium within about two to five days when submerged aerobic culture of shake flask culture is employed, and within about five to ten days when surface culture is used.

The mycelium is separated from the fermentation broth by conventional means such as by filtration or centrifugation. It is preferred to acidify the fermentation broth prior to the removal of the mycelium as by the addition of a mineral acid such as hydrochloric acid. It has been found that acidification to a pH of about pH 2 to about pH 3 is satisfactory. Generally, the removed mycellium contains substantially all of the A116SA and A116SO produced. Therefore, the mycelium is routinely employed in obtaining purified A116SA and A116SO preparations. A116SA and A116SO can be removed from the mycelium by extracting it with a polar solvent such as a lower alcohol. It has been found that ethanol functions satisfactorily as an extractant to remove substantial quantities of the desired compounds contained in the mycelium. The alcoholic extract of the desired compounds is concentrated in vacuo, preferably to about one-half volume. The concentrated extract is usually permitted to stand at refrigeration temperature for at least about 10 hours during which time a precipitate usually separates. Generally, the precipitate has only a slight content of A116SA and A116SO, and therefore, is customarily removed and discarded. However, since the alcoholic extracts will vary in chemical composition, in some cases the precipitates can have a rather substantial content of the desired compounds. Usually, however, the supernatant, which has most of the activity, is evaporated to dryness leaving a reddish-brown and somewhat viscous residue. The residue can be extracted with a solvent such as chloroform to remove the desired compounds. The chloroform extract can be further purified by passing the extract over a column of an adsorbent to cause the desired compounds to adsorb thereon but permiting certain impurities to pass through the column. It has been found that acid-washed alumina works well as the adsorbent. When acid-washed alumina is thus employed, the adsorbed A116SA and A116SO can be eluted from the column as by washing the column with a lower alcohol such as methanol or ethanol, or with a solvent containing a substantial quantity of a lower alcohol. A solid, purified preparation of A116SA and A116SO can be provided by evaporating the effluent containing the desired compounds to dryness. If further purification is desired, the column adsorption procedure can be repeated. Alternatively, the column effluent material can be further purified by dissolving the preparation in methanol and adding activated carbon to the methanolic solution of A116SA and A116SO. The carbon removes certain impurities but permits the desired compounds to remain in the solution. The A116SA and A116SO are recovered from the mixture by removing the carbon as by filtration and evaporating the clear methanolic supernatant to dryness.

If desired, purified single component preparations of A116SA and A116SO can be obtained from mixtures thereof, as from the carbon purified preparations, by employing countercurrent distribution procedures. A presently preferred distribution solvent system for use in the separation of A116SA and A116SO compounds consists of an aqueous phase of 0.05 M sodium phosphate buffer at pH 6.0, and an organic phase of methyl isobutyl ketone. It will be understood, however, that other solvent systems can be employed to separate the compounds. In the sodium phosphate buffer and methyl isobutyl ketone solvent system, the A116SO component is highly soluble in the methyl isobutyl ketone phase whereas the A116SA component will for the most part remain in the initial aqueous phase. Customarily, a 6- to 10-tube countercurrent separation employing the preferred solvent system will satisfactorily separate the two compounds.

Because of their broad antifungal spectra, the novel compounds of this invention are useful in many ways as fungal inhibitory agents. The compounds can be usefully employed to control certain plant pathogenic fungi such as *Alternaria solani*. To control such plant pathogens, the compounds are preferably compounded in sprays, dusts, and the like such as are commonly employed by those skilled in the art of plant disease control. It has been found that a spray containing about 0.2 to about 200 mg./ml. effectively controls *Alternaria solani* infection in tomatoes.

Additionally, the compounds are useful for controlling topical fungal infections encountered in veterinary medicine. The compounds can be compounded in a balm for convenience of application to infected areas.

The invention is further illustrated by the following specific examples:

EXAMPLE 1

*Preparation of A116SA and A116SO*

A sporulated culture of NRRL 2736 is produced by growing the organism on a nutrient agar slant having the following composition:

ASPARAGINE BEEF EXTRACT I

| | G. |
|---|---|
| Soluble corn starch | 20 |
| Asparagine | 1 |
| Beef extract | 3 |
| Agar | 20 |
| Water, added to make a total volume of 1 l. | |

The slant is inoculated with spores of NRRL 2736 and is incubated for five days at about 30° C. The sporulated culture growth on the slant is covered with water, and the slant is scraped gently to remove the spores to provide an aqueous spore suspension.

1 ml. of the spore suspension is used for inoculating under aseptic conditions a 100 ml. portion of a sterile vegetative culture medium having the following composition:

| | G. |
|---|---|
| Glucose | 15 |
| Soybean meal | 15 |
| Corn steep solids | 15 |
| Sodium chloride | 5 |
| Calcium carbonate | 2 |

Tap water, added to make a total volume of 1 l.

The inoculated vegetative medium is incubated at about 30° C. for 48 hours, during which time the incubate is shaken at the rate of 114 cycles per minute on a reciprocal shaker having a 2-inch stroke.

5 ml. of the vegetative inoculum are used to inoculate aseptically 100 ml. portions of the following sterilized production medium contained in 500 ml. Erlenmeyer flasks:

CASEIN SOY YEAST I

| | G. |
|---|---|
| Glucose | 15 |
| Soybean meal | 15 |
| Sodium chloride | 5 |
| Casein | 1 |
| Yeast | 1 |

Water, added to make a total volume of 1 l.

The inoculated culture is incubated for 100 hours at about 26–30° C. During the incubation period, the incubate is shaken at 114 revolutions per minute on a reciprocal shaker having a 2-inch stroke. The pH of the starting medium is about pH 6.5. At the end of the incubation period, the pH of the medium increases to about pH 7.0.

The culture broth obtained is filtered to remove the mycelium. The mycelium contains A116SA and A116SO.

EXAMPLE 2

Preparation of A116SA and A116SO

A sporulated culture of NRRL 2736 is produced by growing the organism on a nutrient agar slant of the following composition:

ASPARAGINE BEEF EXTRACT I

| | G. |
|---|---|
| Soluble corn starch | 20 |
| Asparagine | 1 |
| Beef extract | 3 |
| Agar | 20 |

Water, added to make a total volume of 1 l.

The slant is inoculated with spores of NRRL 2736 and the inoculated slant is incubated for 10 days at a temperature of about 30° C. After incubation, the sporulated culture growth on the slant is covered with water, and the surface of the slant is scraped gently to remove the spores to provide an aqueous spore suspension.

Employing aseptic techniques, the inoculum obtained from one 1-inch agar slant is used to inoculate a 500 ml. portion of a sterilized vegetative culture medium having the following composition and being contained in a 2 l. Erlenmeyer flask:

CORN STEEP YEAST II

| | G. |
|---|---|
| Glucose | 15 |
| Corn steep solids | 5 |
| Yeast | 15 |
| Calcium carbonate | 3 |

Water, added to make a total volume of 1 l.

The incubation is carried on at 28° C. for 48 hours and shaking at 110 cycles per minute on a reciprocal shaker a 2-inch stroke.

To produce a larger quantity of vegetative inoculum, 0.25 gallon of a vegetative inoculum from the flask is added aseptically as an inoculum to 250 gallons of the sterile corn steep yeast II medium contained in a stainless steel 350-gallon fermentation tank. 0.025 gallon of Antifoam A (sold by the Dow Corning Company) is added to the culture medium to prevent excessive foaming. Additions are mare if needed of quantities of Larex No. 1 (an antifoam composition sold by Swift & Company) as an antifoam agent during the growth. The inoculum is allowed to grow for 27 hours at a temperature of 30° C. Throughout the growth period, the medium is aerated with sterile air at the rate of 27 cubic feet per minute and is agitated with two 16-inch impellers rotating at 160 revolutions per minute.

To a 1700-gallon stainless steel fermentor are added 1200 gallons of a medium having the following composition:

CORN STEEP SOY XII

| | Kg. |
|---|---|
| Glucose | 40 |
| Soybean oil meal | 15 |
| Corn steep solids | 5 |
| Calcium carbonate | 2 |
| Sodium chloride | 5 |

Water, added to make a total volume of 1000 l.

The medium is inoculated with 96 gallons of the inoculum grown in the fermentation tank. The fermentation is carried on at 30° C. for 92 hours. The foam is controlled by the addition of polyglycol No. P-2000 (an antifoam product sold by The Dow Chemical Company). The medium throughout the fermentation is aerated by the addition of sterile air at the rate of 112 cubic feet per minute and is agitated with two 22-inch impellers operated at 230 revolutions per minute.

A 5-gallon aliquot of the broth is adjusted to pH 2.5 by the dropwise addition with stirring of 12 N hydrochloric acid. 400 g. of Hyflo (a diatomaceous earth filter aid sold by the Johns-Manville Corporation) are added to the acidified broth and the mixture is filtered. The filter cake is thoroughly washed with tap water. The filtrate and the washes are discarded. 200 g. of the filtrate cake are extracted three times successively with 700 ml. volumes of ethanol. The ethanol extracts are combined and concentrated in vacuo to 400 ml. The ethanol extract containing A116SA and A116SO is permitted to stand in the refrigerator for 16 hours. At the end of the 16-hour period, the ethanol extract is centrifuged and the small precipitate is discarded. The filtrate containing the desired compounds is concentrated to dryness leaving a reddish-brown viscous residue. The residue is extracted two times with 75 ml. volumes of chloroform and the chloroform extracts are combined. A column of acid-washed alumina having a diameter of 1 cm. and a height of 18.5 cm. is prepared and is thoroughly washed with chloroform. A 25 ml. aliquot of the combined chloroform solutions of A116SA and A116SO is passed over the alumina column. The applied A116SA and A116SO are adsorbed on the alumina. However, certain impurities do not adsorb but pass freely through the column when it is washed with 50 ml. of chloroform. The chloroform-washed column is washed with 50 ml. of methanol to elute the adsorbed A116SA and A116SO. The methanolic effluent containing the A116SA and A116SO is evaporated to dryness yielding a light tan solid which has inhibitory action against *Fusarium moniliforme*. Yield: 440 mg.

EXAMPLE 3

Purification of A116SO and A116SA by Carbon Adsorption 300 mg. of a purified A116SA and A116SO preparation provided as described in Example 2 are dissolved in 10 ml. of methanol. 300 mg. of activated carbon are added to the methanolic solution. The mixture is stirred for 30 minutes and is filtered. The filter cake is washed with 5 ml. of methanol, and the wash is combined with the filtrate. The combined filtrate containing A116SA and A116SO is evaporated to dryness providing a cream-colored solid of A116SA and A116SO. Yield: 220 mg. The preparation has inhibitory action against *Fusarium moniliforme*.

The carbon purification step can be repeated if desired.

EXAMPLE 4

*Preparation of Pure A116SA and A116SO Compounds*

20 g. of a preparation containing A116SA and A116SO such as provided by Example 3 are used to prepare pure single-component A116SA and A116SO compounds by means of a counter-current distribution procedure which employs as the aqueous phase, 0.05 phosphate buffer at pH 6.0 saturated with methyl isobutyl ketone, and as the organic phase, methyl isobutyl ketone saturated with the phosphate buffer. A 7-tube, countercurrent distribution is run in which the volume in each phase is 200 ml.

The methyl isobutyl ketone phases which contain A116SO are combined, and washed three times with about 500 ml. of distilled water, and the washed extracts are evaporated in vacuo to dryness. The dry residue is dissolved in 25 ml. of acetone and the acetone solution is filtered. The precipitate is discarded, and the supernatant is concentrated to dryness yielding a light cream-colored amorphous solid consisting of A116SO. Yield: 4.9 g. The product has inhibitory action against *Fusarium moniliforme*. The product can be further decolorized by dissolving it in methanol to a minimum concentration of about 5 percent, treating the solution with activated decolorizing carbon, and recovering the purified A116SO by evaporating the decolorized solution.

The aqueous phases which contain the A116SA are combined and extracted three times with 300 ml. quantities of a solvent consisting of seven parts by volume of methyl ethyl ketone and three parts by volume of n-butanol. The aqueous phas is discarded, and the extracts are combined and concentrated to a dry residue consisting of A116SA. The dry residue is dissolved in 25 ml. of acetone and is filtered to remove a slight amount of precipitate. The precipitate is discarded and the acetone filtrate is evaporated to dryness to yield a light cream-colored amorphous solid consisting of A116SA. Yield: 12.9 g. The product has inhibitory action against *Fusarium moniliforme*.

The A116SA product can be further decolorized by treatment with activated carbon following the procedure set out above for A116SO.

I claim:

1. A method of producing a compound of the group consisting of A116SO and A116SA which comprises cultivating a strain of *Streptomyces endus* which produces said compound, in a culture medium containing assimilable sources of carbon, nitrogen, and inorganic salts, under submerged aerobic conditions until a substantial amount of said compound is produced by said organism in said culture medium.

2. A method according to claim 1 in which the organism is *Streptomyces endus* NRRL 2736.

3. A method according to claim 1 in which the culture medium is maintained at a temperature of about 25–32° C., and the growth of the organism is carried out for a period of about two to about five days.

4. A method of producing a compound of the group consisting of A116SO and A116SA which comprises cultivating a strain of *Streptomyces endus* NRRL 2736 in a culture medium containing assimilable sources of carbon, nitrogen, and inorganic salts, under submerged aerobic conditions until a substantial amount of said compound is produced by said organism in said culture medium and recovering the said compound from said culture medium.

5. A compound selected from the group consisting of A116SO and A116SA, said A116SO being characterized as a white solid, soluble in most polar solvents, relatively insoluble in aqueous solutions, stable in aqueous solution at a pH in the range of about pH 2 to about pH 8, having a molecular weight of about 1840 as determined by electrometric titration in glacial acetic acid, containing about 55.40 percent of carbon, about 8.33 percent of hydrogen, about 13.80 percent of nitrogen and about 22.47 percent of oxygen (by difference), having no ionizable group in the pK′a range of about pK′a 3.5 to pK′a 14 as determined by electrometric titration in dimethyl formamide-water solution (2:1, parts by volume), having threonyl, seryl, prolyl, glycyl, alanyl, valyl, and isoleucyl amino acid groups, having in chloroform solution spectral absorption maxima in the infrared region of $2\mu$ to $15\mu$ at about the following wave lengths expressed in microns: 3.06, 3.41, 3.45, 3.50, 5.73, 6.05, 6.53, 6.65, 6.85, 7.06, 7.22, 7.55, 7.72, 7.85, 8.25, 8.69, 9.17, 9.26, 9.41, and 11.0, having the infrared absorption spectrum shown in FIG I of the drawings, having no spectral absorption maxima in water solution in the ultraviolet region of about 205 m$\mu$ to 400 m$\mu$, having ultraviolet absorption values in water solution at 220 m$\mu$ of about $$E_{1\ cm.}^{1\%} = 130$$

and at 205 m$\mu$ of about $$E_{1\ cm.}^{1\%} = 330$$

and having an optical rotation $[\alpha]_D^{25°}$ of about $-83.4°$, c.=1% in ethanol; and said A116SA being characterized as a white solid, soluble in most polar solvents, relatively soluble in aqueous solutions, stable in aqueous solution at a pH in the range of about pH 2 to about pH 8, having a molecular weight of about 2150 as determined by electrometric titration in glacial acetic acid, containing about 54.52 percent of carbon, about 8.26 percent of hydrogen, about 13.26 percent of nitrogen and about 23.96 percent of oxygen (by difference), having no ionizable group in the pK′a range of about pK′a 3.5 to pK′a 14, as determined by electrometric titration in dimethyl formamide-water solution (2:1, parts by volume), having threonyl, seryl, prolyl, glycyl, alanyl, valyl, and isoleucyl amino acid groups, having in chloroform solution spectral absorption maxima in the infrared region in the range of about $2\mu$ to $15\mu$ at about the following wave lengths expressed in microns: 3.06, 3.41, 3.45, 3.50, 5.73, 6.05, 6.53, 6.65, 6.85, 7.06, 7.22, 7.45, 7.57, 7.73, 7.87, 8.31, 8.70, 9.18, 9.28, 9.42, and 11.0, having the infrared absorption spectrum shown in FIG. II of the drawings, having no spectral absorption maxima in water solution in the ultraviolet region of about 205 m$\mu$ to 400 m$\mu$, having ultraviolet absorption values in water solution at 220 m$\mu$ of about $$E_{1\ cm.}^{1\%} = 130$$

and at 205 m$\mu$ of about $$E_{1\ cm.}^{1\%} = 330$$

and having an optical rotation $[\alpha]_D^{25°}$ of about $-92.4°$, c.=1% in ethanol.

6. The compound, A116SO, as set forth in claim 5.

7. The compound, A116SA, as set forth in claim 5.

References Cited in the file of this patent

Ziffer et al.: Phytopathology, vol. 47, No. 9, p. 539.

Flippin, R. S.: "Two Antifungal Antibiotics Active Against Yeastlike and Filamentous Fungi," a typewritten thesis deposited in May 1956 in the General Library of the University of Kansas City, Missouri: title page, two pages of abstract, one page of approval of thesis for the Department of Biology, one page of Table of Contents, twenty-six numbered pages, four pages of plates (I, II, IIa and III) with four pages, each providing the title or legend for each plate, ten pages of plates (V–XIV), and one page providing the title or legend for all of these ten plates (Plate IV is a part of page 9).